June 22, 1965 G. L. KING ETAL 3,191,071

VARIABLE FREQUENCY/WIDTH PULSE GENERATOR

Filed Feb. 18, 1963 2 Sheets-Sheet 1

GEORGE L. KING
CHARLES A. HIGGINS
INVENTORS

BY Rudolph J. Jurick
ATTORNEY

June 22, 1965 G. L. KING ETAL 3,191,071

VARIABLE FREQUENCY/WIDTH PULSE GENERATOR

Filed Feb. 18, 1963 2 Sheets-Sheet 2

GEORGE L. KING
CHARLES A. HIGGINS
INVENTORS

BY Rudolph J. Juick
ATTORNEY

United States Patent Office 3,191,071

Patented June 22, 1965

3,191,071

VARIABLE FREQUENCY/WIDTH PULSE GENERATOR

George L. King, Morris Plains, and Charles A. Higgins, Boonton, N.J., assignors to Radio Frequency Laboratories, Inc., Boonton, N.J., a corporation of New Jersey Filed Feb. 18, 1963, Ser. No. 259,224
11 Claims. (Cl. 307—88.5)

Figure 1:
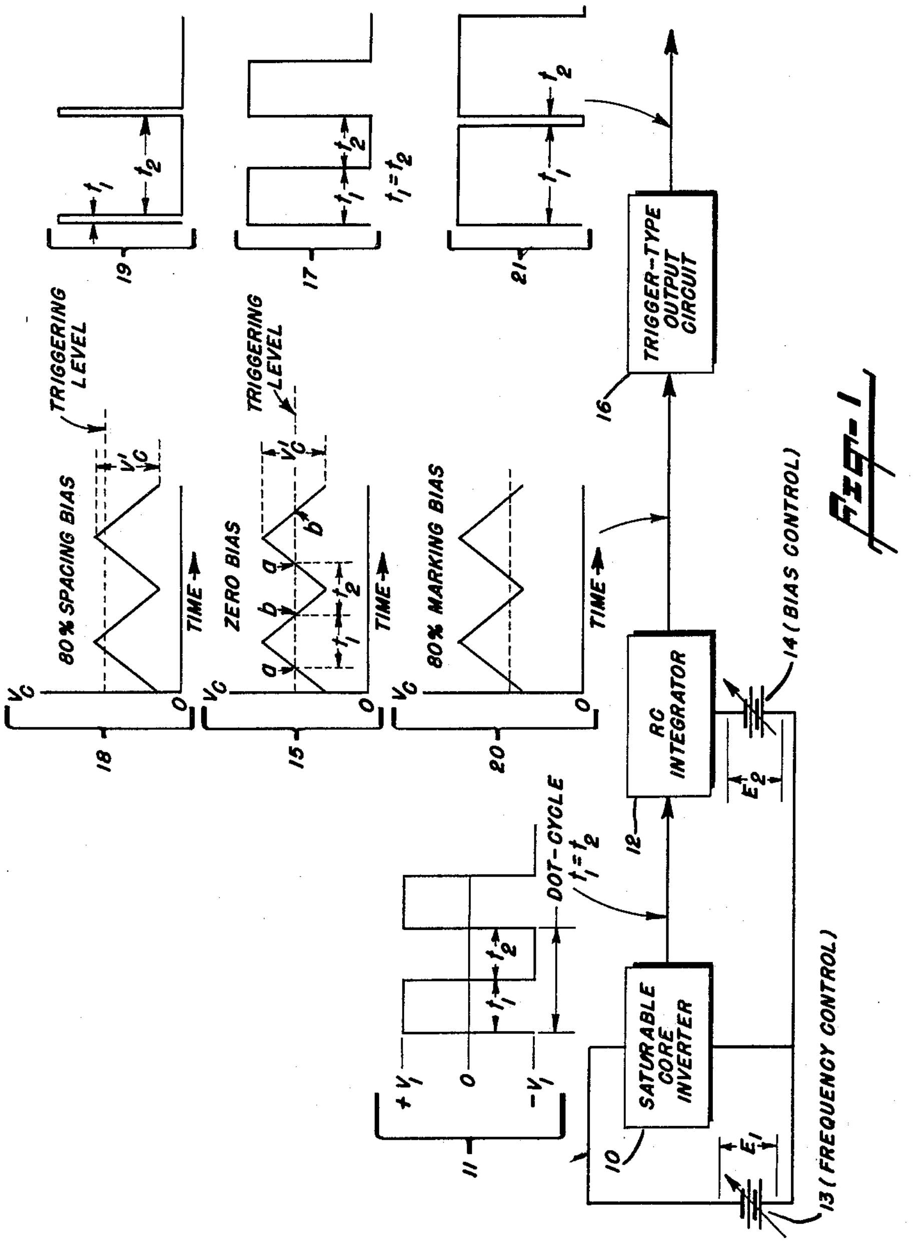

This invention relates to a dot-cycle generator useful in apparatus for testing the recurrence frequency and relative length of electrical pulses.

In data and control transmission systems, intelligence is transmitted in binary code form by means of electrical mark and space signals. Test apparatus for systems of this class must be capable of accurately measuring the frequency and time duration of the mark and space signals, the former being generally referred to as the dot-cycle rate and the latter as percent bias. One part of such testing apparatus comprises a dot-cycle generator which is a keying device for generating a square wave signal alternating between two steady-state conditions (on and off) corresponding, respectively, to mark and space signals. When the time durations of the mark and space signals are equal, the signal is defined as having zero bias. If the mark or space signals exceed their normal elemental length, the excess, expressed as a percentage of the normal length, is defined as percent marking or spacing bias, respectively. One hundred percent marking bias is a continuous marking signal and 100 percent spacing bias is a continuous spacing signal.

For testing purposes, the apparatus must include means for varying the dot-cycle rate and the bias by known, calibrated amounts. Further, it is highly desirable that there be no interaction between these functions. The dot-cycle generator described hereinbelow meets these requirements, thereby overcoming the shortcomings of apparatus heretofore available for this purpose. The dot-cycle generator, made in accordance with this invention, is characterized by the following features:

(a) Reactive elements are utilized to provide the two independent functions which vary with time, namely, the dotting frequency and the signal bias. An inductance is utilized to establish the dotting frequency and a capacitance is utilized to control the signal bias. These components are employed in such manner that there is no interaction between the two functions, one can be varied with no effect upon the other.

(b) The variations of the frequency and the bias are linear functions of separate D.C. voltages. This permits the use of a calibrated linear resistor for adjusting the dot frequency within a predetermined range and a separate calibrated linear resistor for adjusting the bias from zero to 100 percent. Adjustments are made on an analog basis, although fixed resistors and an appropriate switch could be used to obtain incremental adjustments, if desired.

(c) The electrical circuit utilizes active elements (transistors) in the most dependable configurations either as switches or emitter-followers.

An object of this invention is the provision of apparatus for producing square wave output signals and wherein the frequency and the time duration of the signals can be varied as independent functions.

An object of this invention is the provision of a dot-cycle generator for producing mark and space signals and which incorporates separate calibrated elements for adjusting the dotting frequency and percent bias independently of each other.

An object of this invention is the provision of a dot-cycle generator comprising means producing square wave signals of adjustable frequency, means integrating the square wave signals to produce second signals of corresponding frequency but sawtooth wave form, and a trigger circuit actuated by the second signals when the peak value of such signals exceeds a predetermined triggering voltage level.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

Figure 2:
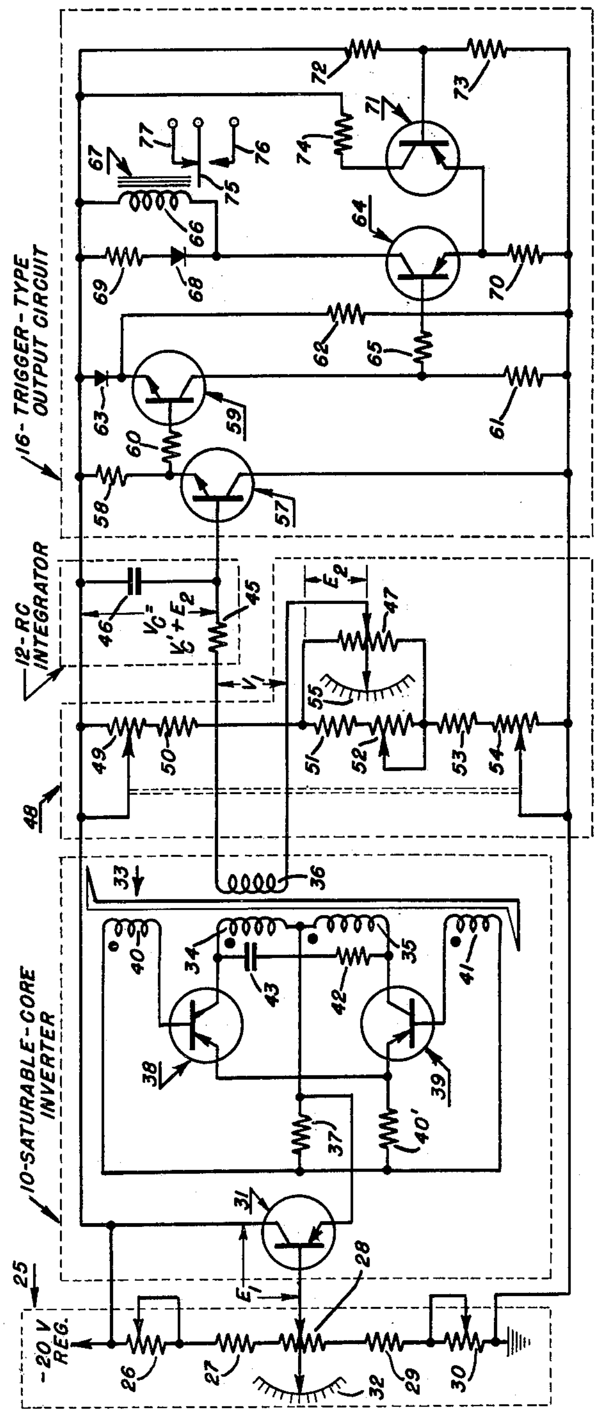

In the drawings wherein like reference characters denote like parts in the several views:

FIGURE 1 is a block diagram showing the major components of a dot-cycle generator made in accordance with this invention and the waveforms of the various voltages; and FIGURE 2 is a schematic circuit diagram of the dot-cycle generator.

Reference, now, is made to FIGURE 1. The dotting frequency is generated by a saturable core inverter 10 producing a square wave output signal 11 which is applied to an RC integrator 12. The core of the inverter is alternately driven to saturation by a voltage ($E_1$) obtained from a D.C. voltage source 13 identified as the Frequency Control. For a given core, the frequency ($f$) of the output voltage ($V_1$) is proportional to the D.C. applied voltage ($E_1$), namely, $$f=\frac{E_1}{4n\phi_s} \quad (1)$$

where, $n$=the number of primary turns on the core, and $\phi_s$= the core saturation flux in webers.

The values of ($n$) and ($\phi_s$) are constants. It is assumed that the voltage drops in the primary winding resistance and in the D.C. switching devices are negligible in magnitude with respect to the applied voltage ($E_1$). Thus, the frequency of the output voltage ($V_1$) will vary directly with the magnitude of ($E_1$) and the peak-to-peak magnitude of the output voltage ($V_1$) will vary directly with its frequency, that is;

$$V_1=4n'\phi_s f \quad (2)$$

where $n'$=the number of secondary (output) turns on the core.

The output waveform is symmetrical and the volt-time product remains constant over a wide range of frequencies, that is, the area under the waveform curve remains constant.

The inverter output voltage ($V_1$) is applied to the RC integrator 12 which is biased by a D.C. voltage ($E_2$) obtained from a source 14 identified as the Bias Control. As will be described in more detail hereinbelow, with reference to FIGURE 2, the output of the integrator is taken across the integrator capacitor. For the present, it suffices to state that the waveform 15 of the A.C. components of the integrator output voltage ($V_c$) is in the form of isosceles triangles, since the waveform of the integrator input voltage ($V_1$) is symmetrical ($V_1=-V_2$) and the time durations $t_1$ and $t_2$, (curve 11) of each cycle are equal ($t_1=t_2$). The peak-to-peak value ($V'_c$) of the integrator output voltage will be essentially constant over the frequency range since ($V'_c$) is an integral of a function which is constant in area (volt-time area) under the curve of ($V_1$), over the frequency range of the inverter.

The integrator output voltage ($V_c$) is applied to a trigger-type circuit 16, which circuit is capable of changing its conducting state abruptly when the magnitude of ($V_c$) reaches a predetermined triggering level. The output voltage of the trigger circuit 16 tends to be a square wave, as shown by the curve 17. The relative time duration of each of the conducting cycles of the trigger circuit 16 can be varied by changing the amplitude of the integrator output voltage ($V_c$) by means of the bias voltage ($E_2$). However, the peak-to-peak amplitude ($V'_c$) of the integrator output voltage remains constant over the entire frequency range of the inverter. It can be shown geometrically that the length of the triggering level line between the intercepting points *a* and *b* on the curve of the voltage ($V_c$), for any given magnitude of ($V_c$), with respect to the length of such line at a zero bias setting will be strictly proportional over the frequency range of the inverter output voltage ($V_1$). Therefore, a given percentage bias setting with the voltage ($E_2$) is not disturbed for any change in the inverter frequency accomplished by changing the magnitude of the voltage ($E_1$).

The magnitude of the integrator output voltage ($V_c$) can be adjusted relative to the predetermined triggering voltage of the trigger circuit (such triggering level being shown on the curve 15) thereby to obtain a desired percent bias of the trigger circuit output, from 0 to 100 percent. In the curve 15, the sawtooth voltage ($V_c$) is symmetrical with respect to the triggering level of the trigger circuit. Under such condition, the square wave output voltage of the trigger circuit (curve 17) also is symmetrical. Specifically, the time durations $t_1$ and $t_2$, of the two half cycles, are equal. If, now, the biasing voltage ($E_2$) is decreased, the magnitude, and only the magnitude, of the integrator output voltage ($V_c$) is lowered relative to the trigger level, as shown by the curve 18. Inasmuch as the frequency of the inverter output voltage ($V_1$) remains constant, the conducting cycles of the trigger circuit 16 are no longer equal and the output voltage of the trigger circuit has a waveform as shown by the curve 19. Such condition would correspond, say, to 80% spacing bias. Similarly, an increase in the biasing voltage ($E_2$) raises the integrator output voltage ($V_c$) relative to the triggering voltage, as shown in the curve 20, thereby altering the output voltage of the trigger circuit as shown in the curve 21. Such condition would correspond, say, to 80 percent marking bias.

The frequency control voltage ($E_1$) and the bias control voltage ($E_2$) are derived from a resistance voltage divider arrangement which desirably permits the use of linear, wire-wound potentiometers to control the magnitude of each such voltage. The potentiometer controlling the magnitude of ($E_1$) is provided with a dial calibrated in frequency and the potentiometer controlling the magnitude of ($E_2$) is provided with a dial calibrated in percent bias.

Reference, now, is made to the schematic circuit diagram of FIGURE 2. The voltage source 25, for the saturable core inverter 10, comprises a voltage divider network connected to a 20 volt regulated D.C. voltage. Such divider comprises the adjustable resistor 26, fixed resistor 27, potentiometer 28, fixed resistor 29 and the adjustable resistor 30. The frequency control potentiometer 28 controls the magnitude of the voltage ($E_1$) applied across the base-collector electrodes of the transistor 31 and has associated therewith a scale 32 calibrated in frequency. A saturable core transformer 33, provided with a center-tapped primary winding 34, 35 and a second winding 36, is designed for operation over a frequency range of 6–25 cycles with an input voltage range of $-3$ to $-12.5$ volts. The center tap of the primary winding is connected to a resistor 37 and the emitter electrode of the transistor 31, while the ends of the windings are connected to the respective collector electrodes of the transistors 38 and 39. Auxiliary transformer windings 40 and 41 are connected to the respective base electrodes of the transistors 38 and 39 and to a resistor 40′ common to both emitters. The transistors 38 and 39 act as switches to apply the D.C. voltage ($E_1$) alternately across the transformer primary windings 34, 35. Such switching is due to blocking-oscillator action of the transistors, with the resistors 37 and 40′ providing a forward bias to insure the start of oscillations. A resistor 42 and a capacitor 43 serve to absorb transient voltages to protect the collector junction of the transistors 38 and 39. The transistor 31 operates in the emitter-follower configuration to provide current gain and to maintain a high input impedance for the inverter circuit. Thus, the D.C. voltage input ($E_1$) is not loaded excessively to impair linear calibration of the potentiometer 28, from which the voltage ($E_1$) is derived.

By voltage divider action, the voltage available across the frequency control potentiometer 28 is approximately $-3$ to $-12.5$ volts. The adjustable resistors 26 and 30 provide a means for setting the upper and lower values of such voltage range thereby to provide end scale frequencies of 6 and 25 cycles on the calibrated scale 32. Such adjustment is desirable to compensate for variations in transformer cores, and the emitter-collector voltage drops of the three transistors, between equivalent pieces of equipment. It will be apparent, that the two transistors 38 and 39 operate as back-to-back connected blocking oscillators so that the turning on of one turns off the other. When the D.C. voltage is applied to the circuit, the transformer core is driven to saturation, first in one direction and then in the other. The oscillations, when once started, are self-sustaining. The inverter output voltage ($V_1$), taken from the transformer secondary winding 36, will have a peak-to-peak value varying directly with frequency, which frequency, in turn, will vary directly with the magnitude of the voltage ($E_1$).

The inverter output voltage ($V_1$) is applied to the RC integrator 12 (comprising the resistor 45 and capacitor 46) which is biased by the D.C. voltage ($E_2$) obtained from the potentiometer 47. This potentiometer is connected across a portion of a voltage divider network 48 comprising the adjustable resistor 49, fixed resistors 50, 51, adjustable resistor 52, fixed resistor 53 and adjustable resistor 54. The adjustable resistors 49 and 54 have their sliders mounted on a common shaft for simultaneous adjustment in the same direction. When the bias control potentiometer 47 is set at the center of its rotation, the adjustable resistors 49 and 54 are adjusted so that the voltage ($V_c$), appearing across the capacitor 46, will be at a value for zero-bias operation of the trigger-type output circuit 16. On the other hand, the resistor 52 is adjusted so that the limits of the control of the potentiometer 47, on the voltage ($E_2$), will yield 100% bias, or less, if desired. The bias control potentiometer 47 has associated therewith a scale 55 calibrated —100%, 0, +100% bias.

The integrator time constant is selected with respect to the magnitude of the voltage ($V_1$) so as to yield an integration voltage ($V'_c$) having as large a peak-to-peak value as possible within the limits of linearity required for a particular application. In the present case, a 6 volt peak-to-peak voltage is acceptable. The integration voltage ($V'_c$) is biased by the D.C. voltage ($E_2$). Consequently, the voltage ($V_c$), appearing across the capacitor 46 at any instant, is the algebraic sum of the voltages ($V'_c$) and ($E_2$), the magnitude of ($E_2$) being adjustable to raise or lower the value of ($V_c$) with respect to triggering voltage of the trigger circuit 16.

At any instant, the integrator output volage ($V_c$), taken across the capacitor 46, will be, $$V_c = \frac{1}{C}\int i\,dt + E_2 \tag{3}$$

where, $C$=the value of the capacitor in microfarads,
$i$=the current flow through the resistor 45.

The current ($i$) remains essentially constant since the ohmic value of the resistor 45 is made large enough so that the combination of the resistor and the voltage ($V_1$) is, in effect, a constant current generator. Thus, $$V_c=\frac{1}{C}\int kdt+E_2=\frac{kt}{C}+E_2 \qquad (4)$$

Hence, the voltage ($V_c$) is approximately a straight-line function of time. Inasmuch as the inverter output voltage ($V_1$) is symmetrical (curve 11, FIGURE 1), the A.C. component of the voltage ($V_c$) will have an isosceles triangle waveform (curve 15, FIGURE 1). The peak-to-peak value of such A.C. component (indicated by ($V'_c$) in curve 15) will be essentially constant over the frequency range, since such voltage is a function of the voltage ($V_1$) which is constant in area under the volt-time graph of ($V_1$) over the frequency range of the inverter.

In the trigger circuit 16, the transistor 57 acts as an emitter-follower to reduce the loading on the integrator, the resistor 58 being the emitter load resistor. The output of the transistor 57 is coupled to the base of the transistor 59 by a resistor 60, such transistor having a load resistor 61 connected to the collector electrode. This transistor 59 is biased to cut-off by the resistor 62 and a Zener diode 63. When the voltage ($V_c$) across the integrator capacitor reaches a value equal to the sum of Zener voltage plus the base-emitter barrier potentials of the transistors 57 and 59 and the base current drop across the resistor 60, the transistor 59 conducts. The gain of the transistor 59 stage is high enough so that conduction occurs in a short period of time at the trigger voltage level. Conversely, when the value of ($V_c$) drops below this level, the transistor 59 is cut-off abruptly by the reverse bias which the Zener voltage applies to the emitter. Actually, the Zener voltage can be considered as approximately the value of the trigger level of the circuit.

The voltages appearing at the collector of the transistor 59 tend to be square waves and can have a dot-cycle bias of 0 to 100%, depending upon the setting of the bias control potentiometer 47. Such voltages are applied to the base of the transistor 64 by means of a coupling resistor 65. The operating coil 66, of a relay 67, is connected in the collector circuit of the transistor 64 and in parallel with an inverse-transient protection circuit comprising the diode 68 and resistor 69. Such relay is provided with a set of dry contacts 75, 76, 77 constituting the output circuit of the dot-cycle generator.

The resistor 70 constitutes the emitter bias resistor for the transistor 64 and is clamped to a regulated bias voltage by the transistor 71. Such bias voltage cuts off the transistor 64 unless the transistor 59 conducts and permits current to flow into the base of the transistor 64. This regulating feature prevents the emitter of the transistor 64 from following the base input signal, thereby preventing degeneration, while, at the same time, increasing the sensitivity and power output of the transistor 64. The transistor 71 is connected as an emitter-follower to serve as a voltage regulator, the regulated voltage level being determined by the fixed bias applied to the base of this transistor from a voltage divider comprised of the From the above description, it will be apparent that resistors 72 and 73. A resistor 74 constitutes a voltage dropping resistor to reduce the power which would otherwise be dissipated in the transistor 71.

the contacts of the output relay 67 will open and close in correspondence with the energization and deenergization of the operating coil 66 as the transistor 59 abruptly swings between the conducting and non-conducting states. The frequency at which the relay movable contact 75 moves into engagement with the front stationary con- during which the relay movable contact dwells against tact 76 and back into engagement with the back stationary contact 77 constitutes the dot-cycle rate of the apparatus and is controlled by the setting of the frequency control potentiometer 28. On the other hand, the time one or the other associated, fixed contacts constitutes the percent marking or spacing bias and is controlled by the setting of the bias control potentiometer 47. The dot-cycle rate and the percent bias are separate functions independently controlled with no interaction of one with the other. Inasmuch as the variations of the dot-cycle rate and the percent bias are linear functions of separate D.C. voltages, the circuit is adapted nicely to the use of calibrated, linear potentiometers for varying one or both of these functions.

Although the described adjustments of the dotting frequency and the percent bias are on an analog basis, it is apparent the two control potentiometers can be replaced by fixed resistors and multiple-position switches to obtain incremental adjustments of these two functions. The described circuit utilizes a saturable core inverter and an RC integrator. However, any type of inverter-integrator-trigger combination which is capable of producing the independently adjustable waveforms, similar to those described, could be employed. It is intended that these and other changes and variations can be made without departing from the scope and spirit of the invention as recited in the following claims.

We claim:

1. A variable frequency/width pulse generator comprising, (a) a saturable core inverter to produce first signals of square wave form, (b) an adjustable direct current voltage applied to said inverter to simultaneously vary the frequency and amplitude of said first signals, (c) a voltage integrator, (d) means to apply the inverter output to said integrator, (e) a direct current biasing voltage for said integrator to produce output signals of a frequency corresponding with that of the first signals but of sawtooth wave form, (f) a trigger circuit capable of changing its conducting state abruptly at a predetermined triggering voltage level, and (g) means applying said integrator output signals to said trigger circuit, said direct current biasing voltage being selectively adjustable to vary the level of said output signals relative to the triggering voltage level of the trigger circuit.

2. The invention as recited in claim 1, wherein the integrator comprises a capacitor and wherein the means for selectively adjusting the level of said output signals comprises an adjustable direct current voltage applied across the capacitor in series with the said first signals.

3. The invention as recited in claim 1, including an output relay having an operating coil connected to the trigger circuit and energized when the trigger circuit is in the conducting state.

4. A variable frequency/width pulse generator comprising, (a) a saturable core transformer having a primary winding and a secondary winding, (b) a first source of direct current voltage having a minimum magnitude sufficient to produce saturation of said core, said first source of direct current voltage being applied to the transformer primary winding alternately in opposite directions, (c) an integrator comprising a capacitor and series resistor, (d) a second source of direct current voltage, (e) means applying the voltage from said second source across the capacitor and resistor in series with the transformer secondary winding, (f) a trigger circuit capable of changing its conducting state abruptly when the magnitude of the integrator output voltage reaches a predetermined level, and (g) means to apply the voltage appearing across said capacitor to the trigger circuit.

5. The invention as recited in claim 4, including first manually-operable means for adjusting the magnitude of the voltage of said first source, a scale calibrated in frequency values associated with said first manually-operable means, a second manually-operable means for adjusting the magnitude of the voltage of said second source, and a scale calibrated in percentage values associated with the second manually-adjustable means.

6. A variable frequency/width pulse generator comprising, (a) a saturable core transformer having a secondary winding and a primary winding with a center tap, thereby dividing said primary winding into two sections, (b) a source of direct current voltage of predetermined fixed magnitude, (c) a first voltage divider resistor network including a first potentiometer and connected across said source of direct current voltage, (d) switching means to apply the output voltage of the first potentiometer alternately to said two sections of the transformer primary winding, (e) a capacitor and a resistor connected in series to one end of said secondary winding, one side of the capacitor being connected to one terminal of said source of direct current voltage, (f) a second voltage divider resistor network including a second potentiometer and connected across said source of direct current voltage, (g) means to apply the output of said second potentiometer to the other end of said secondary winding, (h) an on-off trigger circuit having a predetermined triggering voltage level, and (i) means to apply the voltage appearing across the said capacitor to the said trigger circuit in a sense to cause actuation thereof when the value of the voltage appearing across the capacitor exceeds the said predetermined triggering voltage level.

7. The invention as recited in claim 6, including a scale calibrated in frequency values associated with the said first potentiometer and a scale calibrated in percentage values associated with the said second potentiometer.

8. The invention as recited in claim 6, wherein the said first voltage divider network includes adjustable resistors for setting the upper and lower limits of said scale calibrated in frequency values, and wherein the second voltage divider network includes adjustable resistors for setting the upper and lower limits of the scale calibrated in percentage values.

9. The invention as recited in claim 6, wherein the said switching means comprises, (a) a first transistor having a base connected to the movable arm of said first potentiometer, a collector connected to the negative side of said source of direct current voltage and an emitter connected to the center tap of said primary winding, (b) first and second auxiliary windings on the transformer core, (c) second and third transistors, (d) leads connecting the base and emitter of the second transistor across the first auxiliary winding through a first resistor, and the collector to an end of one of the transformer primary winding, (e) leads connecting the base and emitter of the third transistor across the second auxiliary winding through the said first resistor, and the collector to the other end of the transformer primary winding, and (f) leads connecting the other ends of the auxiliary windings to the center tap of the said primary winding through a second resistor.

10. The invention as recited in claim 6, including a relay having an operating coil energized by the said source of direct current voltage when the trigger circuit is in the on condition.

11. The invention as recited in claim 6, including a relay having an operating coil and wherein the trigger circuit comprises, (a) a first transistor having a base and emitter connected across said capacitor and an emitter connected to the positive side of said source of direct current voltage, (b) a second transistor having an emitter-collector circuit connected across said source of direct current voltage through a Zener diode, and a base connected to the emitter of said first transistor, (c) a third transistor having an emitter-collector circuit connected across said source of direct current voltage through said relay operating coil and in a sense reverse to that of the second transistor emitter-collector circuit, and a base connected to the collector of the second transistor, and (d) a fourth transistor having an emitter-collector circuit connected across said source of direct current voltage, and a base connected to a third resistance voltage divider network that is connected across said source of direct current voltage.

References Cited by the Examiner

UNITED STATES PATENTS 3,095,508 6/63 Karsh ............... 307—88.5

ARTHUR GAUSS, *Primary Examiner.*

JOHN W. HUCKERT, *Examiner.*

UNITED STATES PATENT OFFICE
CERTIFICATE OF CORRECTION

Patent No. 3,191,071 — June 22, 1965

George L. King et al.

It is hereby certified that error appears in the above numbered patent requiring correction and that the said Letters Patent should read as corrected below.

Column 5, line 60, beginning with "this transistor" strike out all to and including "open and close" in line 65, same column 5, and insert instead -- this transistor from a voltage divider comprised of the resistors 72 and 73. A resistor 74 constitutes a voltage dropping resistor to reduce the power which would otherwise be dissipated in the transistor 71.

From the above description, it will be apparent that the contacts of the output relay 67 will open and close --.

Signed and sealed this 7th day of December 1965.

(SEAL)
Attest:

ERNEST W. SWIDER
Attesting Officer

EDWARD J. BRENNER
Commissioner of Patents